(12) United States Patent
Obhi et al.

(10) Patent No.: US 6,262,822 B1
(45) Date of Patent: Jul. 17, 2001

(54) CIRCUIT FOR MONITORING OPTICAL SIGNALS

(75) Inventors: Jasvinder Obhi; Paul Colbourne, both of Nepean (CA)

(73) Assignee: JDS Fitel Inc., Nepean (CA)

(*) Notice: Subject to any disclaimer, the term of this patent is extended or adjusted under 35 U.S.C. 154(b) by 0 days.

(21) Appl. No.: 09/078,033

(22) Filed: May 13, 1998

(51) Int. Cl.⁷ ..................................................... H04J 14/02
(52) U.S. Cl. ........................ 359/130; 359/127; 359/110; 359/124; 359/170; 359/123; 359/193
(58) Field of Search ..................................... 359/114, 139, 359/170, 150, 152, 193, 123, 110

(56) References Cited

U.S. PATENT DOCUMENTS

| | | | |
|---|---|---|---|
| 5,101,290 | * 3/1992 | Eng et al. | 359/123 |
| 5,233,453 | * 8/1993 | Sivarajan et al. | 359/117 |
| 5,283,845 | 2/1994 | Ip | 385/24 |
| 5,646,762 | 7/1997 | Delavaux et al. | 359/173 |
| 5,748,350 | * 5/1998 | Pan et al. | 359/130 |
| 5,786,915 | * 7/1998 | Scobey | 359/127 |
| 5,815,294 | * 9/1998 | Ishikawa et al. | 359/110 |
| 5,822,476 | * 10/1998 | Jopson | 385/27 |
| 6,040,932 | * 3/2000 | Duck et al. | 359/124 |

OTHER PUBLICATIONS

Calvin Miller, et al., "Multiplexed fiber gratings enhance mechanical sensing," *Laser Focus World*, Mar., 1998.

Micron Optics, Inc., "Product Information," Atlanta, Ga.

* cited by examiner

*Primary Examiner*—Leslie Pascal
*Assistant Examiner*—Chau M. Nguyen
(74) *Attorney, Agent, or Firm*—Neil Teitelbaum

(57) ABSTRACT

The present invention relates to a circuit for monitoring optical signals in a multiple channel system. A tunable band pass filter receives and input signal comprising multiple channels each having a different wavelength and predetermined channel spacing. Output from the tunable filter is directed to a second filter having a periodic response with wavelength, such as an etalon. The response is designed to block wavelengths of light corresponding to the channels, permitting noise in the inter-channel space to be measured by a detector. A reference circuit launches light from a broad band source through a Bragg grating into the tunable filter. The Bragg grating reflects a known reference wavelength. Light which passes from the reference source through the tunable filter is also passed through the second filter to a detector. When a notch is detected by the reference detector, the tunable filter is known to be tuned to the reference wavelength. A comparison to the signal output at the first detector is used to correlate the position of the notch and the location of any inter-channel noise. A third filter, also preferably a fixed etalon, has a periodic response which matches the channel spacing designed to block wavelengths of light corresponding to the inter-channel spaces. A third detector measures the channel amplitude and also correlates the response with the reference notch to identify the individual channels. Advantageously, the monitoring circuit can provide channel and noise information associated with each channel without using costly and complex elements to identify the wavelength of the responses.

16 Claims, 1 Drawing Sheet

CIRCUIT FOR MONITORING OPTICAL SIGNALS

FIELD OF THE INVENTION

This invention relates generally to a monitor for interrogating a plurality of wavelengths corresponding to a plurality of channels or inter-channel wavelengths in an optical communications system and for providing information relating to optical energy at wavelengths, particularly signal to noise ratios.

BACKGROUND OF THE INVENTION

To increase the capacity of communications systems, wavelength division multiplexing systems have been developed. Such systems transmit signals on a plurality of wavelengths. At the receiver, or at intermediate points for channel monitoring, it is frequently desirable or necessary to select a particular wavelength signal from a group of several wavelengths. The strength of each channel can then be measured, channels can be selectively amplified, or problems such as missing channels or excessive signal to noise (S/N) can be detected.

Wavelength calibration is typically performed by comparing a reference signal to the transmitted or received signal. Reference signals may include a stable wavelength laser source or coherent beat or other means. As disclosed in U.S. Pat. No. 5,283,845 issued to JDS Fitel Inc. in 1994, a known broadband source is provided through a wavelength monitor and control circuit to adjust a tunable etalon filter spacing. However these referencing techniques require more complicated input transmission devices which generate known frequencies and more complicated detecting circuits for performing wavelength comparisons. To monitor a plurality of channels through a single tunable filter assembly providing a known wavelength source to tune the filter for each channel would be difficult, cumbersome and expensive.

In a prior art system disclosed in U.S. Pat. No. 5,646,762 issued to Lucent Technologies, a reference signal is provided by a separate source into a tunable sampling filter. Example reference sources include a semiconductor laser, a fiber ring laser or a fiber grating laser. However, the filter calibration, and the resulting sampled channel information are only as accurate as the known wavelength of the reference signal. These stable wavelength lasers are expensive, and subject to a degree of error.

It is necessary in large multiple channel systems to be able to monitor the signals precisely. It is desired to provide a simplified referencing system for identifying multiple channels without impeding signal transmission. It is also important to know the signal to channel noise ratio to properly assess signal quality. This capability does not exist in the prior art for monitoring multiple channel systems.

SUMMARY OF THE INVENTION

By passing a multi-channel optical signal first through a tunable band pass filter to sequentially isolate a small portion of the signal, for example a single channel, or the interchannel spacing, and then passing that small portion through a fixed etalon which has a periodic response selected to match the channel or interchannel spacing, each channel or the interchannel spacing can be examined individually for signal strength. If the portion of the signal is passed from the tunable bandpass filter to a fixed etalon having a response to match inter-channel spacing, specific interchannel wavelengths can be examined to determine noise levels. The combination of a tunable bandpass filter with a filter having a periodic response provides a monitor which is able to isolate and measure a broad range of channels in a multiple channel system and to determine where noise is occurring and to measure its amplitude between channels.

In accordance with the invention there is provided, a monitor for monitoring a plurality of optical input channels and for monitoring energy between adjacent channels, each channel being spaced apart from an adjacent channel by predetermined inter-channel spacing, each of the plurality of channels having a different central wavelength, said monitor comprising:

a tunable bandpass filter having an input end and an output end, the filter having a passband selected to pass a bandwidth less than the predetermined channel spacing while substantially blocking wavelengths outside the passband, the filter being tunable to sequentially pass wavelengths corresponding to each of the plurality of channels, and the wavelengths in the inter-channel spaces;

an output terminal optically coupled to the output end of the tunable filter for receiving light that has propagated through the tunable filter;

first detector means for detecting a characteristic of the light at the output terminal;

a second filter having a periodic response optically coupled to the output end of the tunable filter for receiving light that has propagated through the tunable filter, the second filter being dimensioned, in accordance with the predetermined channel spacing, to pass central wavelengths in the inter-channel spaces and to substantially block central wavelengths of light corresponding to the plurality of channels; and second detector means, for detecting a characteristic of light that passes through the second filter.

In accordance with the invention there is provided, a monitor for monitoring a plurality of optical communications channels and for monitoring inter-channel bands corresponding to wavelengths of light between said optical communications channels, comprising:

a tunable filter, tunable to pass each of the communications channels and inter-channel bands, one at a time while substantially blocking other of said channels and inter-channel bands;

a fixed etalon coupled to receive light that has passed through the tunable filter, the fixed etalon having a free spectral range that will substantially transmit wavelengths of light in the inter-channel bands while substantially blocking wavelengths of light corresponding to said communications channels; and, and sensor means for detecting light that has propagated through the fixed etalon.

In accordance with the invention a monitor is provided for monitoring a plurality of input channels and for monitoring energy between channels, each channel being spaced apart from an adjacent channel by predetermined inter-channel spacing, each of the plurality of channels having a different central wavelength, said monitor comprising:

a tunable bandpass filter for scanning and sequentially transmitting wavelengths in a range including the plurality of channels;

a first periodic filter for blocking channel wavelengths from the response transmitted through the bandpass filter, and allowing inter-channel wavelengths from the response transmitted through the bandpass filter to pass;

a second periodic filter for blocking inter-channel wavelengths from the response transmitted through the bandpass filter, and allowing channel wavelengths from the response transmitted through the bandpass filter to pass;

a reference circuit for identifying at least one wavelength during the bandpass filter scan;

detector means for detecting the responses from the first and second periodic filters and the reference circuit;

means for comparing the response from the reference circuit to the responses of the periodic filters for providing a channel identification to each response during the scan.

In accordance with a preferred embodiment of the invention the monitor further includes a means for determining the wavelength at which the tunable filter is tuned. In a preferred embodiment the means comprises a reference circuit comprising a reference light source, an optical element having a known wavelength response, and a detector to detect the response of the reference circuit, such that when the reference light is directed through the tunable filter, the wavelength response is detected when the tunable filter is tuned at the reference wavelength. Preferably, the reference light is directed through a second path of the tunable filter so that the reference light does not interfere with the signal light.

The present invention allows inter channels noise to be measured with a wider bandwidth tunable filter, easing manufacturing requirements.

Further advantages will be apparent to persons of skill in the art with reference to the following description of preferred embodiments by way of example only, in conjunction with the following drawings in which:

BRIEF DESCRIPTION OF FIGURES

Like numerals are used throughout to depict like elements.

DETAILED DESCRIPTION

Figure 1:
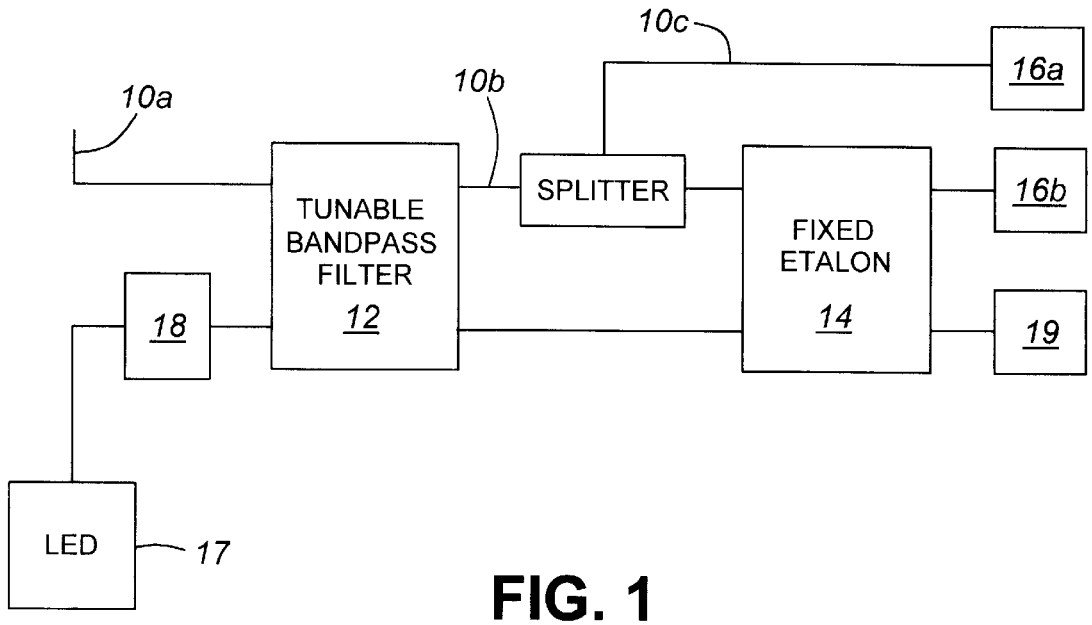
FIG. 1 is a schematic illustration of a monitoring circuit in accordance with the present invention.

Referring now to FIG. 1 a block diagram is shown, of an optical circuit for monitoring and interrogating individual channels in a multi-channel optical communications system. An optical signal is launched into an input optical fiber 10a coupled to an input end of a tunable bandpass filter 12, such as a tunable etalon or tunable grating. An output optical fiber 10b is optically coupled to an output end of the tunable filter 12 to receive light that passes through the filter 12. A tap including a 3 dB splitter and including an optical fiber 10c is coupled with the optical fiber 10b for receiving a known portion of the light launched in the fiber 10b from the filter 12. The remaining portion of the light is propagated onward within the fiber 10b toward a fixed etalon 14 or similar filter providing a periodic response. A first sensor 16a is disposed to receive light from an end of the fiber 10c; a second sensor 16b is optically coupled to an end of the fiber 10b to detect an intensity of the light that has passed through the etalon 14.

The bandpass filter 12 is tunable over a range of wavelengths corresponding to the input channels of the multi-channel optical system. For example, an etalon 12 is tunable to a central wavelength $\lambda 1, \lambda 2, \lambda 3, \ldots$ or $\lambda n$ that correspond to channels 1, 2, 3, . . . . n; Thus, the etalon 12 is utilized to interrogate any one of these channels, one at a time, passing light energy corresponding to one of the single channels 1, 2, 3, . . . n and substantially blocking the signal light of the other n-1 adjacent channels, also 12 is used to interrogate wavelengths between channels. As the tunable filter 12 scans over the range of wavelengths, any energy in the inter-channel wavelengths is examined in the responses from the second filter 14.

The second fixed etalon 14 exhibits a periodic response which has a free spectral range selected to match the channel spacing and tuned so that signal energy between channels is passed by the etalon 14, while at the same time, the channel central wavelengths $\lambda 1, \lambda 2, \lambda 3, \ldots \lambda n$ will be blocked. Thus, when the etalon 12 passes light, for example including wavelength $\lambda 1+(\lambda 2-\lambda 1)/2$, the second etalon 14 further blocks any transmission of channel signal and isolates any small amount of energy at these inter-channel wavelengths from greater signal energy of adjacent channels. In this manner, it is possible for the region between channels to be interrogated to determine noise levels present. Hence, since it is preferred that there is as little signal energy as possible at the inter-channel wavelengths, the tunable etalon 12 in series with the fixed periodic etalon 14 provide a means of interrogating wavelengths between each of the channels by providing this twice filtered light to the second sensor 16b in the form of a detector. With a periodic response corresponding to each of the inter-channel wavelengths it is convenient to use the fixed etalon 14 to monitor each inter-channel space. Only the tunable etalon 12 must be adjusted.

In accordance with the invention, a tunable filter 12 is provided that can be tuned to pass particular wavelengths while substantially blocking others. In FIG. 1 a reference portion of a control circuit is shown to provide information to a processor, (not shown) for determining the position, or gap between reflective end faces of the tunable etalon. The sensing portion of the control circuit includes a broad spectrum LED 17, a Bragg grating 18 having a known response, a fixed etalon 14, and a detector 19. In operation, light from the LED 17 is launched through the Bragg grating 18 into the input end of the tunable etalon 12. The Bragg grating 17 reflects a predetermined wavelength $\lambda_B$ and passes other wavelengths of light. The reference signal is also passed through the etalon 14. As a result, the detector 19 will detect a signal having a response indicative of the free spectral range of the etalon 14, having a notch located at the wavelength $\lambda_B$. Without 17, the signal at 19 would show the transmission peaks of 14, but there would be no possibility of identifying which peak related to which wavelength. This notch location can then be compared to the response of the input signal through the etalon 14, to identify the transmission peaks of the etalon 14.

Figure 2:
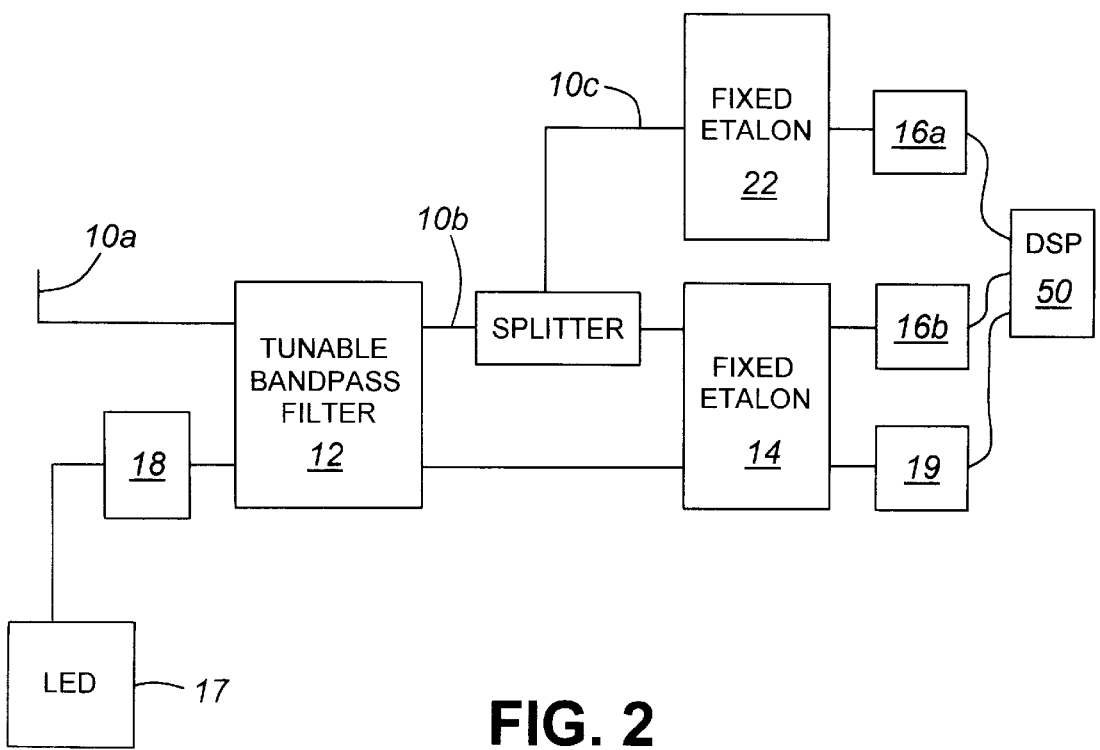
FIG. 2 is a schematic illustration of an alternative monitoring circuit in accordance with the present invention.

Referring now to FIG. 2, an alternative embodiment of the invention is shown where a third etalon, in the form of a fixed etalon 22 is shown coupled to the optical fiber 10c for further filtering the optical signal provided on that fiber. The fixed etalon 22 has a free spectral range that is coincident with the channels spacing of the channels 1, 2, 3, . . . n. This single filter 22 is capable of providing filtering that will allow central wavelengths $\lambda 1, \lambda 2, \lambda 3, \ldots \lambda n$ to pass and will substantially block other wavelengths of light outside of these channels. In operation, when the first tunable etalon 12 passes, channel 1 for example, the etalon 22 provides second filtering of that channel ensuring that only that channel is being interrogated and not wavelengths that correspond to the inter-channels spacing. Fixed etalons 14 and 22 can be selected for a desired channel spacing, eg. 50 GHz or 100 GHz. Providing this second filter to the signal isolates a specific and determined channel width. With this information, more accurate wavelength determination of signal to noise response is possible.

A microprocessor 50 is provided to make a comparison of the reference signal and the selected signal to determine a wavelength referenced correlation. A comparison of the location of the reference notch created by the Bragg grating 18 with the location of the signal information filtered through the fixed periodic filter 14, 22 allows for accurate identification of each channel or interchannel signal for measurement. Drifts caused by temperature change or other factors in the signal can also be compensated for in the microprocessor programming. To measure actual wavelength to determine drift or other changes, a counter associated with the tunable filter can be used which determines a count as the tunable filter 12 scans over one free spectral range.

The broad spectrum LED 17 provides a signal at each wavelength through the tunable bandpass filter 12. One reference wavelength is reflected by the Bragg grating 18. When the tunable filter is adjusted to pass this wavelength, little response is detected by the reference detector 19. As the tunable etalon sweeps back and forth through a range of wavelengths, the response at the reference detector 19 periodically indicates the notch caused by the Bragg grating reflecting a known wavelength. With each cycle, this notch indicates the position and wavelength of the tunable grating. From this reference, the position of responses of the periodic filter 22 spaced to match the channel spacing, can be determined relative to the reference wavelength as channel 1,2,3 . . . n and the inter-channel spaces can be similarly identified.

A tunable diffraction grating can be used in place of the tunable etalon 12 for isolating signal transmission. The grating isolates a deeper and narrower profile of a transmission signal. This gives better rejection of wavelengths outside the channel or interchannel window of interest. A more accurate measure of actual signal to noise can thus be obtained.

The tunable filter 12 could be a tunable etalon, or a tunable diffraction grating. An alternative to the fixed etalon would be an asymmetric Mach-Zehnder interferometer or other interferometric device.

What is claimed is:

1. A monitor for monitoring a plurality of optical input channels and for monitoring energy between adjacent channels, each channel being spaced apart from an adjacent channel by predetermined inter-channel spacing, each of the plurality of channels having a different central wavelength, said monitor comprising:
   a tunable bandpass filter having an input end and an output end, the filter having a passband selected to pass a bandwidth less than the predetermined channel spacing while substantially blocking wavelengths outside the passband, the filter being tunable to sequentially pass wavelengths corresponding to each of the plurality of channels, and the wavelengths in the inter-channel spaces;
   an output terminal optically coupled to the output end of the tunable filter for receiving light that has propagated through the tunable filter;
   first detector means for detecting a characteristic of the light at the output terminal;
   a second filter having a periodic response optically coupled to the output end of the tunable filter for receiving light that has propagated through the tunable filter, the second filter being dimensioned, in accordance with the predetermined channel spacing, to pass central wavelengths in the inter-channel spaces and to substantially block central wavelengths of light corresponding to the plurality of channels; and
   second detector means, for detecting a characteristic of light that passes through the second filter.

2. A monitor for monitoring a plurality of optical input channels and for monitoring energy between adjacent channels as defined in claim 1, further including a reference circuit for determining the wavelength at which the tunable bandpass filter is set.

3. A monitor as defined in claim 2, wherein the means for determining the wavelength at which the tunable bandpass filter is set comprises an optical element having a predetermined wavelength response, and a detector for detecting the response of the optical element.

4. A monitor as defined in claim 3, wherein the optical element is a Bragg grating.

5. A monitor as defined in claim 4, further including a reference broad band light source for launching light through the Bragg grating into an input in the tunable bandpass filter.

6. A monitor as defined in claim 5, wherein the detector receives a response after light from the broadband source has passed through the second filter.

7. A monitor as defined in claim 6, further including means for comparing the response from the broadband light source to the response from the input signal for determining the wavelength of the input signal response.

8. A monitor as defined in claim 1, wherein the tunable bandpass filter comprises a tunable etalon.

9. A monitor as defined in claim 1, wherein the tunable bandpass filter comprises a tunable diffraction grating.

10. A monitor as defined in claim 8, wherein the second filter comprises a fixed etalon having a free spectral range which matches the predetermined channel spacing of the optical input channels.

11. A monitor as defined in claim 10, wherein the second etalon has a free spectral range of 100 GHz.

12. A monitor as defined in claim 10, wherein the second etalon has a free spectral range of 50 GHz.

13. A monitor as defined in claim 7 further including a third filter comprising a third fixed etalon for blocking response in the inter-channel spacing for measuring the central channel wavelength as passed through the tunable bandpass filter.

14. A monitor for monitoring a plurality of optical communications channels and for monitoring inter-channel bands corresponding to wavelengths of light between said optical communications channels, comprising:
   a tunable filter, tunable to pass each of the communications channels and inter-channel bands, one at a time while substantially blocking other of said channels and inter-channel bands;
   a fixed etalon coupled to receive light that has passed through the tunable filter, the fixed etalon having a free spectral range that will substantially transmit wavelengths of light in the inter-channel bands while substantially blocking wavelengths of light corresponding to said communications channels; and,
   and sensor means for detecting light that has propagated through the fixed etalon.

15. A monitor as defined in claim 14 further comprising a second fixed etalon having a free spectral range that will substantially transmit wavelengths corresponding to the plurality of channels, and sensor means for detecting light that has propagated through the second fixed etalon.

16. A monitor for monitoring a plurality of input channels and for monitoring energy between channels, each channel being spaced apart from an adjacent channel by predetermined inter-channel spacing, each of the plurality of channels having a different central wavelength, said monitor comprising:

a tunable bandpass filter for scanning and sequentially transmitting wavelengths in a range including the plurality of channels;

a first periodic filter for blocking channel wavelengths from the response transmitted through the bandpass filter, and allowing inter-channel wavelengths from the response transmitted through the bandpass filter to pass;

a second periodic filter for blocking inter-channel wavelengths from the response transmitted through the bandpass filter, and allowing channel wavelengths from the response transmitted through the bandpass filter to pass;

a reference circuit for identifying at least one wavelength during the bandpass filter scan;

detector means for detecting the responses from the first and second periodic filters and the reference circuit;

means for comparing the response from the reference circuit to the responses of the periodic filters for providing a channel identification to each response during the scan.

* * * * *